(12) United States Patent
Yernaux (10) Patent No.: US 12,314,934 B2
(45) Date of Patent: May 27, 2025

(54) ELECTRONIC TRANSACTION DEVICE COMPRISING A MECHANISM AFFORDING PROTECTION AGAINST THE INSERTION OF A NON-COMPLIANT OBJECT INTO THE CHIP CARD READER

(71) Applicant: BANKS AND ACQUIRERS INTERNATIONAL HOLDING, Paris (FR)

(72) Inventor: Olivier Yernaux, Romans-sur-Isère (FR)

(73) Assignee: BANKS AND ACQUIRERS INTERNATIONAL HOLDING (FR)

( * ) Notice: Subject to any disclaimer, the term of this patent is extended or adjusted under 35 U.S.C. 154(b) by 30 days.

(21) Appl. No.: 18/035,414

(22) PCT Filed: Nov. 4, 2021

(86) PCT No.: PCT/EP2021/080690
§ 371 (c)(1),
(2) Date: May 4, 2023

(87) PCT Pub. No.: WO2022/096606
PCT Pub. Date: May 12, 2022

(65) Prior Publication Data
US 2024/0013192 A1    Jan. 11, 2024

(30) Foreign Application Priority Data
Nov. 4, 2020   (FR) ...................................... 2011292

(51) Int. Cl.
*G06Q 20/34* (2012.01)
*G06K 13/08* (2006.01)

(52) U.S. Cl.
CPC ......... *G06Q 20/34* (2013.01); *G06K 13/0875* (2013.01)

(58) Field of Classification Search
CPC . G06Q 20/34; G06K 13/0875; G06K 13/0868
See application file for complete search history.

(56) References Cited

U.S. PATENT DOCUMENTS

| 2015/0213334 A1* | 7/2015 | Ishikawa | ................. | G06K 7/082 |
| | | | | 235/475 |
| 2017/0061259 A1* | 3/2017 | Goh | ................... | G06K 13/0875 |

FOREIGN PATENT DOCUMENTS

| JP | 2000099637 A | 4/2000 |
| WO | 2015181875 A1 | 12/2015 |
| WO | 2017073463 A1 | 5/2017 |

* cited by examiner

Primary Examiner — Laura A Gudorf
(74) Attorney, Agent, or Firm — Dilworth IP, LLC (57) ABSTRACT

An electronic transaction device including a chip card reader and a shut-off mechanism for shutting off a slot for the introduction of a chip card as far as the card reader, the slot being formed by two lateral guide rails for guiding the card, the mechanism including a first shut-off flap and a second shut-off flap for shutting off the slot, the shut-off flaps being able to adopt a closed position preventing a non-compliant object from being introduced into the slot as far as the card reader, and an open position allowing the chip card to be introduced into the slot as far as the card reader, the shut-off flaps each including an actuating element which is situated respectively in the vicinity of one of the two lateral guide rails.

11 Claims, 7 Drawing Sheets

ELECTRONIC TRANSACTION DEVICE COMPRISING A MECHANISM AFFORDING PROTECTION AGAINST THE INSERTION OF A NON-COMPLIANT OBJECT INTO THE CHIP CARD READER

FIELD OF THE INVENTION

This invention relates to the field of electronic transaction devices such as electronic payment terminals, automatic teller machines or automatic payment terminals implemented, for example, in car parks, beverage dispensers, washing stations, petrol stations or transport ticket purchasing terminals.

More particularly, this technique relates to such transaction devices which are installed outdoors and/or without surveillance.

Even more particularly, this technique relates to the protection of these devices against the insertion of a non-compliant object or foreign body into the chip card reader of these devices.

BACKGROUND OF THE INVENTION

"Self-service" electronic transaction devices are known, which allow a user to withdraw cash from an automatic teller machine or make a transaction autonomously on a payment terminal, for example on a beverage dispenser or a transport ticket purchasing terminal or even in a washing station or a petrol station.

These self-service electronic transaction devices are generally installed outdoors and are not monitored by a human presence. Consequently, these electronic transaction devices are frequently put out of service due to vandalism or through incorrect use of the device.

More precisely, non-compliant objects are frequently inserted into the slot for the introduction of the chip card or payment card. For example, underground or car park tickets, coins, half-cards or even mixing sticks (coffee stirrers) are regularly placed/introduced into the slot of the electronic transaction device, thus putting it out of service.

To try to overcome this problem, automatic teller machines have been fitted with an exterior shut-off flap which prevents any object from being introduced into the slot.

More precisely, this exterior flap only opens when the payment card needs to be introduced to perform the transaction. In other words, this exterior flap is controlled electronically by the transaction device, when a payment card needs to be inserted during an electronic transaction.

This solution, although relatively complex to implement since it requires electronic control, proves efficient to prevent an unwanted object from being introduced into the slot when the transaction device is not used (flap closed). However, the disadvantage with this solution is that it does not prevent a non-compliant object from being introduced into the slot when the flap is open while waiting for the payment card to be introduced. Since the flap is open, a non-compliant object can be inserted into the slot.

Consequently, this solution is not entirely satisfactory.

Figure 1:
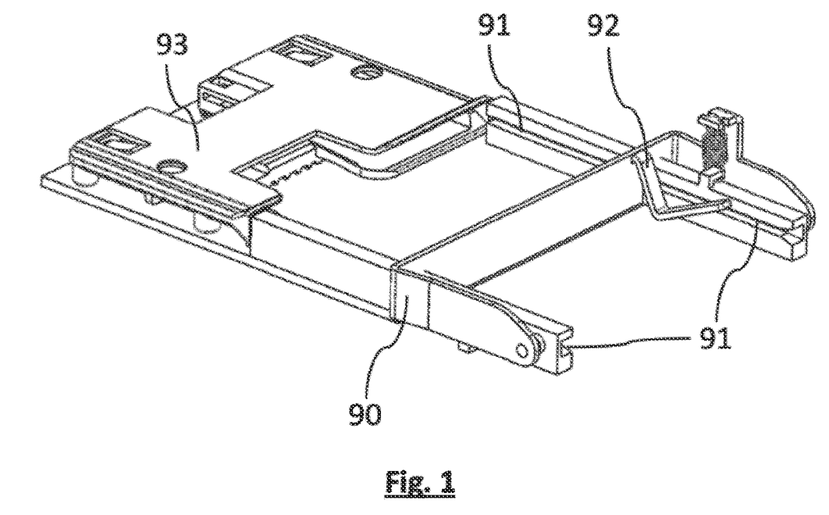
FIG. 1 shows a perspective view of a solution for shutting off a slot for the introduction of a chip card according to the prior art.
Figure 2:
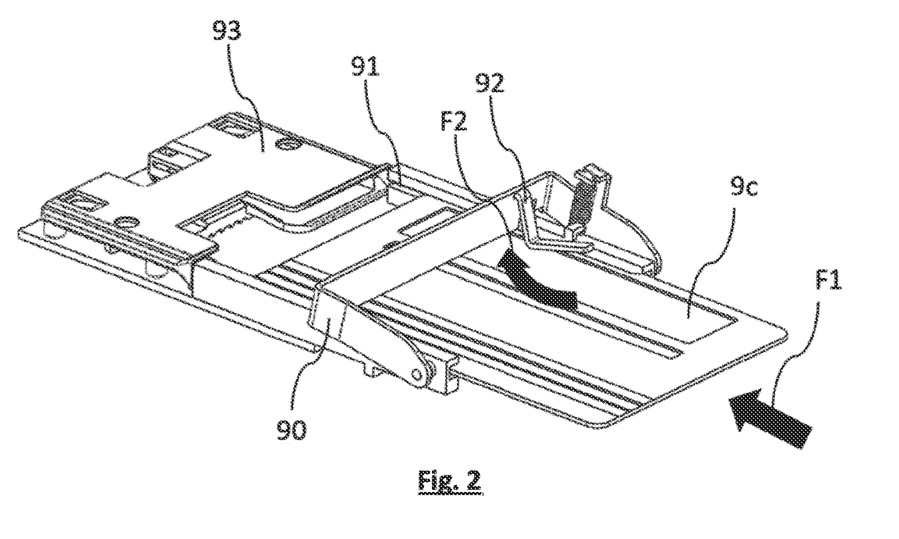
FIG. 2 shows another perspective view of the solution of FIG. 1 wherein a chip card is inserted in the chip card reader.
Figure 3:
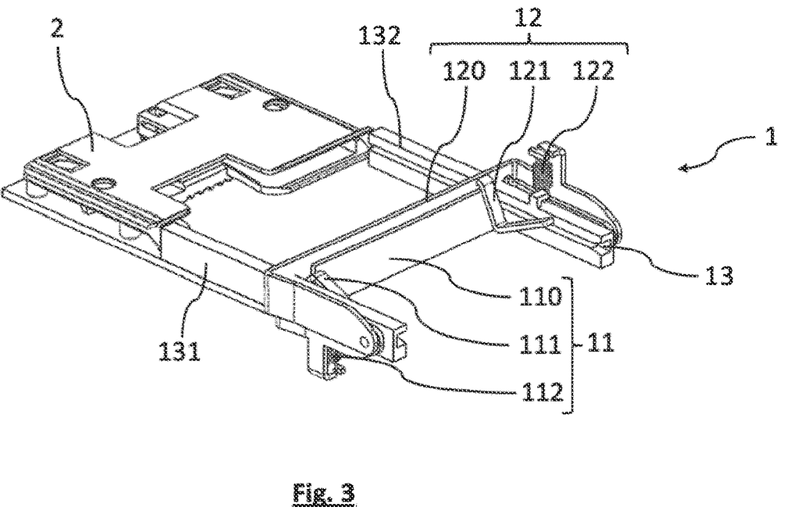
FIG. 3 shows a perspective view of the shut-off mechanism for shutting off a slot for the introduction of a chip card according to the proposed technique.
Figure 4:
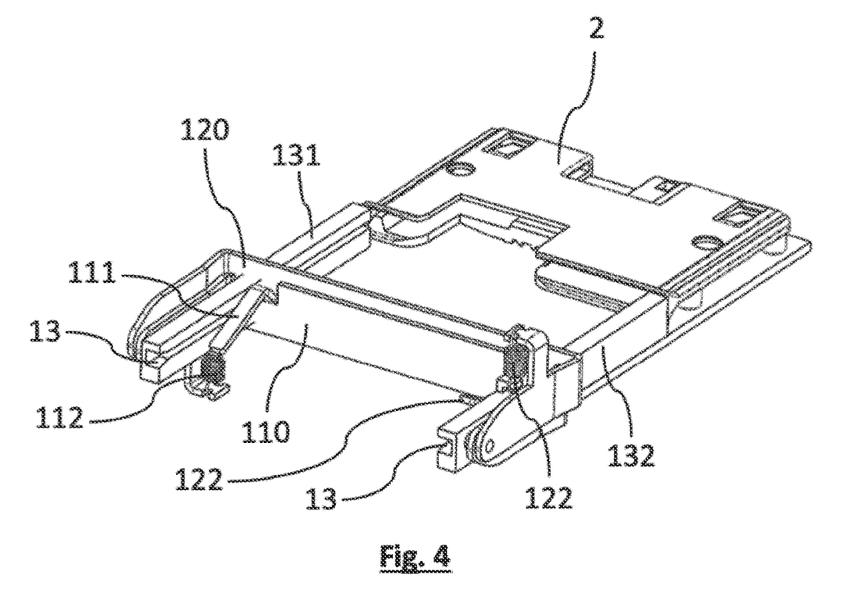
FIG. 4 shows another perspective view of the shut-off mechanism for shutting off a slot for the introduction of a chip card according to the proposed technique.

Another solution of the state of the art, known for more than fifteen years and shown on FIGS. 1 and 2, consists in implementing a purely mechanical shut-off mechanism which comprises a shut-off flap 90 situated substantially in the middle of the slot 91, in the longitudinal direction of introduction of a card as far as the card reader. This shut-off flap only opens when the object 9c introduced into the slot 91 actuates a cam 92 causing the flap 90 to move. In other words, and as shown on FIG. 2, when an object 9c is introduced (in the direction of the arrow F1) into the slot 91, the cam 92 is rotated, which causes the shut-off flap 90 to open (in the direction of the arrow F2). Generally, the cam 92 is situated in the vicinity of an edge of the slot 91, as shown.

This mechanical solution is relatively simple to implement. However, a disadvantage of this solution lies in the fact that the flap opens as soon as an object actuates the cam. In other words, this solution does not distinguish between payment cards and non-compliant objects such as car park or underground tickets, half-cards or coffee "stirrers".

This solution cannot detect whether the dimensions (width and thickness in particular) of the object inserted comply/correspond to those of a payment card so as to prevent the insertion of a non-compliant object.

Consequently, if a non-compliant object is inserted and actuates the cam, the flap opens. When the flap is in the open position, the object inserted and/or other objects can be introduced into the slot and therefore block the card reader 93. The electronic transaction device is then out of service and a maintenance operation is therefore required to put the transaction device back into service.

This solution, although simple to implement, is therefore not satisfactory.

There is therefore a need to provide a solution affording protection against the insertion of a non-compliant object into the chip card reader of an electronic transaction device which is simple to implement and which, according to at least one embodiment, can remedy at least some of the disadvantages of the solutions of the state of the art.

SUMMARY OF THE INVENTION

The proposed technique can solve at least some of the problems of the prior art. More particularly, this technique relates to an electronic transaction device comprising a chip card reader and a shut-off mechanism for shutting off a slot for the introduction of a chip card as far as the chip card reader, the slot being formed by at least two lateral guide rails for guiding the chip card.

According to the proposed technique, the mechanism comprises a first shut-off flap and a second shut-off flap for shutting off the slot, the shut-off flaps being able to adopt a closed position preventing a non-compliant object from being introduced into the slot as far as the chip card reader, and an open position allowing the chip card to be introduced into the slot as far as the chip card reader.

Still according to the proposed technique, the shut-off flaps each comprise an actuating element which is situated respectively in the vicinity of one of the two lateral guide rails of the slot.

The proposed technique can therefore be used in particular to prevent the flaps from opening if the width of the object introduced does not comply with the width of a standard chip card, due to the positions of the flap actuating elements on each side of the slot, in the vicinity of the slot lateral guide rails. In other words, the proposed technique can be used to detect that the width of the object introduced is correct. This special arrangement of the actuating elements therefore requires the introduction of an object actuating them simultaneously so that the flaps open, thus allowing the object to be introduced further into the slot. If the two actuating elements are not actuated together, then the two flaps do not open, so as to prevent an object which would not be compliant from being introduced.

According to a particular aspect of this technique, the actuating elements are implemented opposite each other in a horizontal plane of the slot, the first flap moving from the closed position to the open position in a first direction and the second flap moving from the closed position to the open position in a second direction, opposite the first direction.

The reversed positioning of the actuating elements of the two flaps, with respect to a horizontal plane, allows the shut-off flaps to open in opposite directions. More particularly, this opening of the shut-off flaps in opposite directions results in an inclined introduction of an object having a non-compliant thickness in particular, so as to prevent it from being introduced further into the slot due to the partial opening of the flaps.

According to a particular aspect, the actuating elements consist of a first actuating cam and a second actuating cam respectively attached to the first and second shut-off flaps.

The implementation of actuating elements consisting of cams attached to the shut-off flaps is relatively simple and efficient. With such an implementation using cams, the resistance applied when introducing a chip card is not too high, so that the action remains comfortable for the user while allowing precise detection of a non-compliant object.

According to another aspect, the displacement travel of the shut-off flaps depends on the thickness of the chip card introduced or of the non-compliant object introduced.

In other words, the displacement of the shut-off flaps depends on the angle of displacement of the actuating cams. Consequently, if the object introduced is not sufficiently thick, the flaps do not open sufficiently/completely, so as to prevent a non-compliant object from being introduced into the slot.

According to another aspect, the two shut-off flaps adopt their open position when the actuating elements are actuated simultaneously and through a predetermined displacement angle.

Thus, the two actuating cams must be actuated at the same time and with an object that is sufficiently thick to allow the shut-off flaps to open. In the other cases, the slot is not sufficiently cleared to allow an object to be introduced.

According to a particular aspect, the shut-off flaps each comprise a return spring.

The shut-off flaps are therefore held in the closed position when no chip card is introduced into the slot. In addition, when removing the chip card or a non-compliant object, the shut-off flaps return automatically to their closed position. Lastly, the presence of these springs increases the effect of antagonism on the opening of the flaps, by also maintaining an antagonistic force on each cam so as to prevent a non-compliant object, having a width that is substantially identical to that of a chip card, but being less thick, or less rigid, than a chip card, from being introduced.

According to another particular aspect, the dimensions of the slot are substantially identical to the standard dimensions of a chip card.

Thus, the slot prevents a non-compliant object, which would have a width and/or a thickness greater than those of the slot, from being introduced.

BRIEF DESCRIPTION OF DRAWINGS

The proposed technique, as well as the various advantages it offers, will appear more clearly on reading the description which follows of an illustrative and non-limiting embodiment, and referring to the attached drawings in which.

DETAILED DESCRIPTION OF THE INVENTION

We will now describe an embodiment of the proposed technique, given as a simple illustrative and non-limiting example, and referring to FIGS. 3 to 13.

The term "object 9" refers in the remainder of the document to an object that a person is trying to introduce into the slot of the electronic transaction device, and which could be a chip card or a non-compliant object. The term "non-compliant object", referenced 9b, includes in the remainder of the document any object that is not a chip card, itself referenced 9a. In the examples shown on FIGS. 7 to 10, the non-compliant object 9b consists of an underground ticket or a car park ticket.

FIGS. 3 to 6 show an electronic transaction device according to the proposed technique comprising a chip card reader 2, a slot for the introduction of a chip card 13, formed in particular by two lateral rails 131, 132 (left and right) to guide the chip card 9a as far as the card reader 2, and a shut-off mechanism 11, 12 for shutting off the slot 13 intended to afford protection against the insertion of a foreign body (or of a non-compliant object) into the chip card reader.

The shut-off mechanism for shutting off the slot 13 comprises a first, or front, shut-off assembly 11 and a second, or rear, shut-off assembly 12. Each of these assemblies comprises a shut-off flap, an actuating element and a return spring. The mechanism is intended to shut off the slot 13 so as to prevent a non-compliant object 9b from being introduced into the slot as far as the chip card reader 2.

Consequently, the risk of introducing a non-compliant object 9b into the chip card reader 2 of the transaction device 1 and of putting the latter out of service is limited. The transaction device 1 is therefore kept in service and the number of maintenance operations is reduced.

More precisely, the front assembly 11 comprises a first shut-off flap 110, called the front flap, mounted movable in rotation with respect to the slot 13 between a closed position (shown on FIG. 3) shutting off the slot 13 and preventing a non-compliant object 9b from being introduced into the slot 13, and an open position (shown on FIG. 5) clearing the slot 13 and allowing a chip card 9a to be inserted.

A first actuating element 111, consisting according to this embodiment of a first actuating cam, situated in the vicinity of one of the guide rails of the slot 13, is attached to the front flap 110 and is used to rotate the front flap 110 from the closed position to the open position when it is actuated by an object 9. In this example, the first actuating cam 111 is situated in the vicinity of the guide rail 131 (on the left of the slot 13 on FIGS. 3, 4, and 11 in particular).

When an object 9 is introduced into the slot 13, it comes into contact with the first actuating cam 111. As the object 9 moves into the slot 13, the first actuating cam 111 is rotated, thus rotating the front flap 110 from the closed position to the open position so as to fully clear the access to the slot 13 (if the rear flap 120 is also cleared, as described below).

The front assembly 11 further comprises a return spring 112, attached to the front flap 110 and working in traction so as to hold the front flap 110 in the closed position when no object is actuating the first actuating cam 111.

Thus, the front flap 110 is held in the closed position so as to prevent an object from being introduced into the slot 13 as far as the card reader 2 until the first actuating cam 111 is actuated. Actuating the first actuating cam 111 therefore moves the front flap 110 against/despite the tractive force of the return spring 112. An object 9b that would not actuate the first actuating cam 111 (as shown for example on FIG. 7) would therefore abut directly against the front flap 110.

The return spring 112 also improves the detection of a non-compliant object 9b that is not sufficiently thick as described below.

Figure 5:
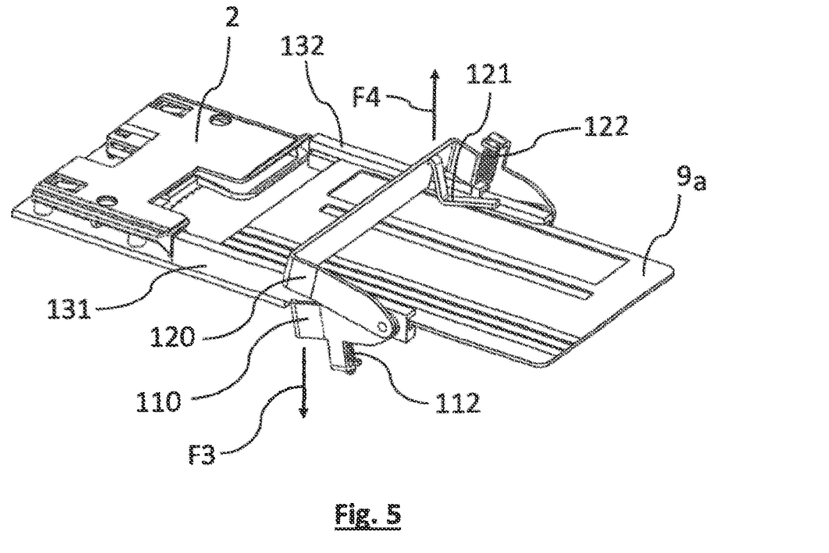
FIG. 5 shows a perspective and top view of the shut-off mechanism of FIG. 3 showing a chip card introduced into the slot.
Figure 6:
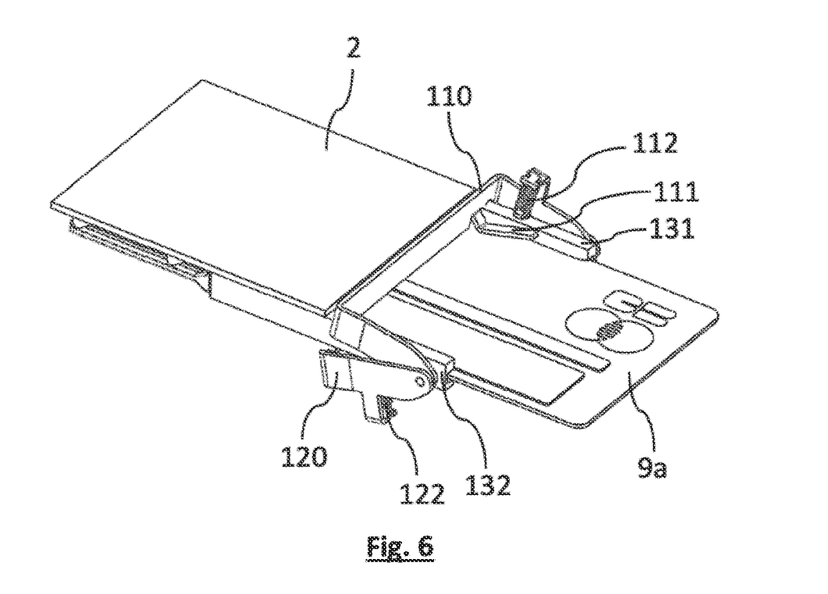
FIG. 6 shows a perspective and bottom view of the shut-off mechanism of FIG. 3 showing a chip card introduced into the slot.

For example, as shown on FIG. 5, the front flap 110 of the front assembly 11 opens by moving/pivoting downwards, as shown by the arrow F3.

The rear assembly 12 has the same structure and operates in the same way as the front assembly 11. However, the rear assembly 12 is arranged/mounted symmetrically with respect to the horizontal plane of the slot 13. Thus, unlike the front flap 110 which opens downwards as shown on the view of FIG. 5 for example, the rear flap 120 opens upwards in the direction of the arrow F4 shown on FIG. 5 in particular.

More precisely, the rear assembly 12 comprises a second shut-off flap 120, called the rear flap, mounted movable in rotation with respect to the slot 13 between a closed position (shown on FIG. 3) shutting off the slot 13 and an open position (shown on FIG. 5) clearing the slot 13 and allowing the insertion of a chip card 9a.

A second actuating element 121, consisting according to this embodiment of a second actuating cam, situated in the vicinity of the other guide rail 132 of the slot 13, is attached to the rear flap 120 and is used to rotate the rear flap 120 from the closed position to the open position when it is actuated by an object 9. In this example, the second actuating cam 121 is therefore situated in the vicinity of the edge/guide rail opposite the first actuating cam 111, in other words in the vicinity of the right guide rail 132 of the slot 13 (on FIGS. 3, 5, 7, 9, 10 and 11 in particular).

When an object 9 is introduced into the slot 13, it comes into contact with the second actuating cam 121. As the object 9 moves into the slot 13, the second actuating cam 121 is rotated, thus rotating the rear flap 120 from the closed position to the open position in order to fully clear the access to the slot 13 (if the front flap 110 is also cleared, as described above).

The rear assembly 12 further comprises a return spring 122, attached to the rear flap 120 and working in traction so as to hold the rear flap 120 in the closed position when no object is actuating the second actuating cam 121.

Thus, the rear flap 120 is held in the closed position so as to prevent an object 9 from being introduced into the slot 13 as far as the card reader 2 until the second actuating cam 121 is actuated. Actuating the second actuating cam 121 therefore moves the rear flap 120 against/despite the tractive force of the return spring 122. An object 9b that would not actuate the second actuating cam 121 (as shown for example on FIG. 7) would therefore not be able to reach the chip card reader 2.

The return spring 122 also improves the detection of a non-compliant object 9b that is not sufficiently thick as described below.

Note that the shut-off flaps 110, 120 are attached to the actuating cams 111, 121 and that it is therefore the actuating cams 111, 121 which control the displacement of the shut-off flaps 110, 120.

More precisely, the displacement travel of the shut-off flaps 110, 120 depends on the thickness of the object 9 introduced. In other words, the displacement of the shut-off flaps 110, 120 depends on the angle of displacement of the actuating cams 111, 121.

Thus, if the object 9 introduced is not sufficiently thick, in other words it is not as thick as a chip card 9a, the actuating cams 111, 121 will not move through a sufficient predetermined angle for the shut-off flaps 110, 120 to open sufficiently to allow an object 9 to be introduced into the slot.

To summarise, if a chip card 9a is introduced into the slot 13, the actuating cams 111, 121 will pivot through a displacement angle equal to a predetermined displacement angle calculated according to the standard thickness of a chip card 9a (for example between 0.68 millimetres and 0.84 millimetres according to standard ISO/IEC 7810). The displacement of the actuating cams 111, 121 through this predetermined angle moves the shut-off flaps 110, 120 along a proportional distance, from their closed position to their open position, in order to fully clear the slot 13.

Thus, when the shut-off flaps 110, 120 are both in the open position, they clear a space between them that is substantially equal to the thickness of the slot 13. This space is large enough to allow the passage of a chip card 9a.

If a non-compliant object 9b, such as an underground ticket or a car park ticket, is inserted into the slot 13, the actuating cams 111, 121 will pivot through a displacement angle that is less than the predetermined displacement angle. The displacement of the actuating cams 111, 121 through this angle that is less than the predetermined angle is therefore not sufficient to move the shut-off flaps 110, 120 from their closed position to their open position.

In other words, the displacement travel of the shut-off flaps 110, 120 is not, in this case, sufficient, to fully clear the slot 13, since the shut-off flaps 110, 120 leave no space between them, or the space cleared is too small for a non-compliant object 9b to be inserted as far as the chip card reader 2. The non-compliant objects 9b therefore abut against the shut-off flaps 110, 120 and are prevented from reaching the chip card reader 2.

In order to clear the slot 13, the two actuating cams 111, 121 must therefore be actuated at the same time and by an object that is sufficiently thick to allow the shut-off flaps 110, 120 to open fully. In the other cases, the slot 13 is not cleared sufficiently to allow the non-compliant object 9b to be introduced.

The proposed solution can therefore solve the technical problem by preventing objects having a non-compliant width and/or thickness from being introduced as far as the card reader and thus damaging the electronic transaction device or preventing it from operating.

According to the proposed technique, the shut-off mechanism therefore comprises two assemblies 11, 12 which are arranged symmetrically with respect to a horizontal plane of the slot 13 and which selectively shut off and clear the access to the chip card reader 2 via the slot 13. The presence of these two assemblies thus prevents the insertion of non-compliant objects having a width that is less than that of a chip card, such objects only actuating one of the two assemblies when they are inserted on one side of the slot or the other.

In this embodiment; the front flap 110 is offset along the longitudinal axis of the slot 13. More precisely, the front flap 110 is situated closer to the end from which the chip card is introduced into the slot 13 than the rear flap 120. This configuration prevents in particular a non-compliant object from being introduced when the two flaps are not in their open position simultaneously.

Thus, the introduction of an object 9 having a width and a thickness that are compliant with those of a chip card 9a (as shown on FIGS. 5 and 6 in particular) actuates successively the second actuating cam 121 of the rear flap 120 then the first actuating cam 111 of the front flap 110 so as to successively open the shut-off flaps 110, 120 and access the chip card reader 2.

Figure 9:
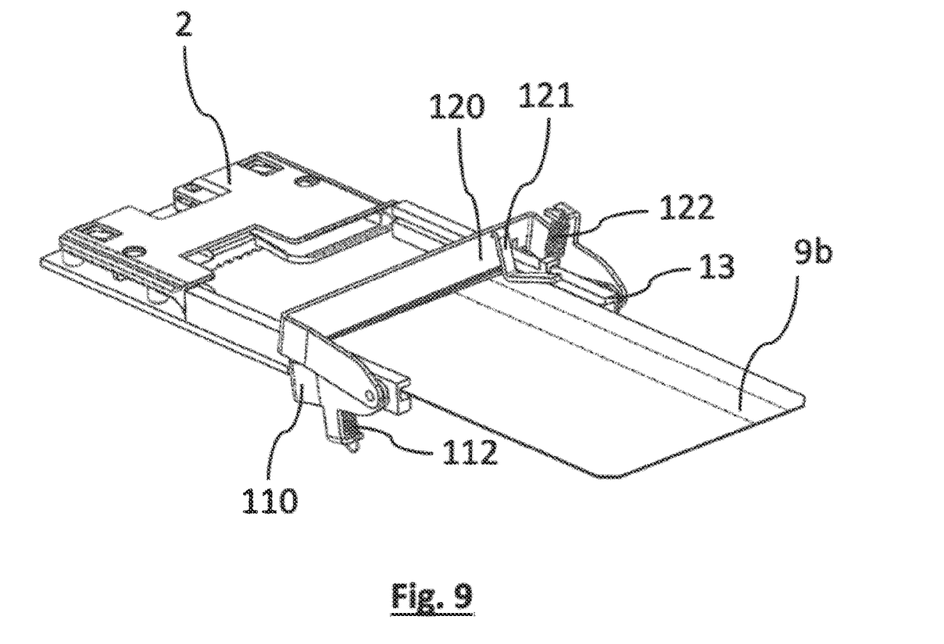
FIG. 9 shows a perspective and top view of the shut-off mechanism of FIG. 3 showing an attempt to introduce a car park ticket into the slot.
Figure 10:
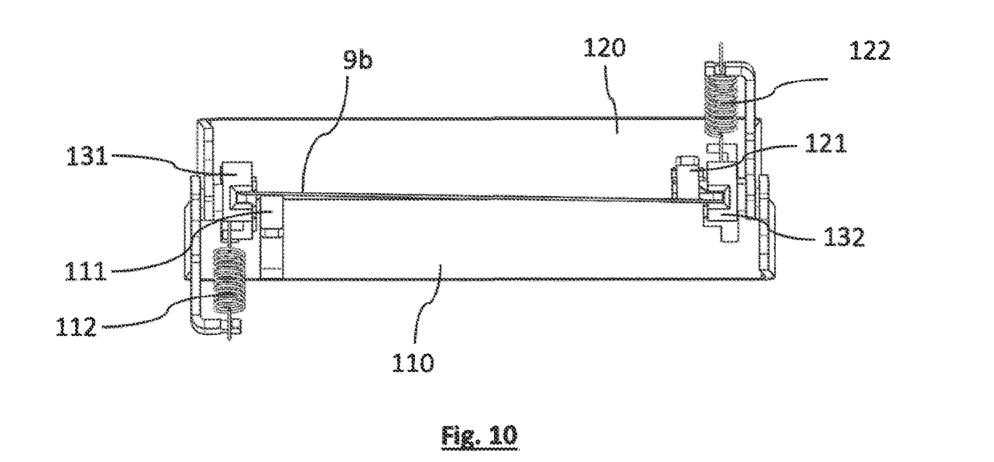
FIG. 10 shows a front view of the shut-off mechanism of FIG. 9.
Figure 11:
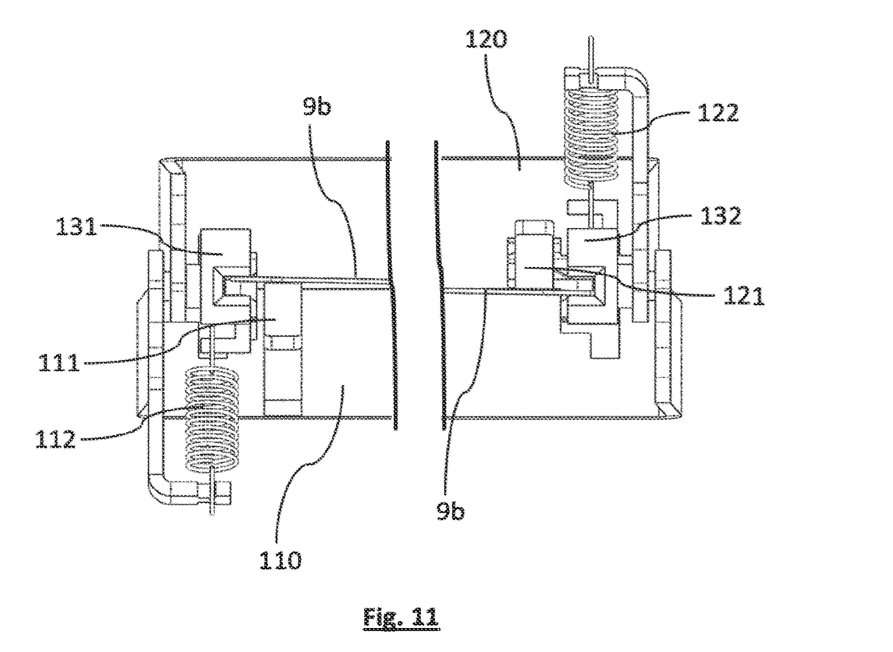
FIG. 11 shows a partial and front view of the shut-off mechanism of FIG. 9.
Figure 12:
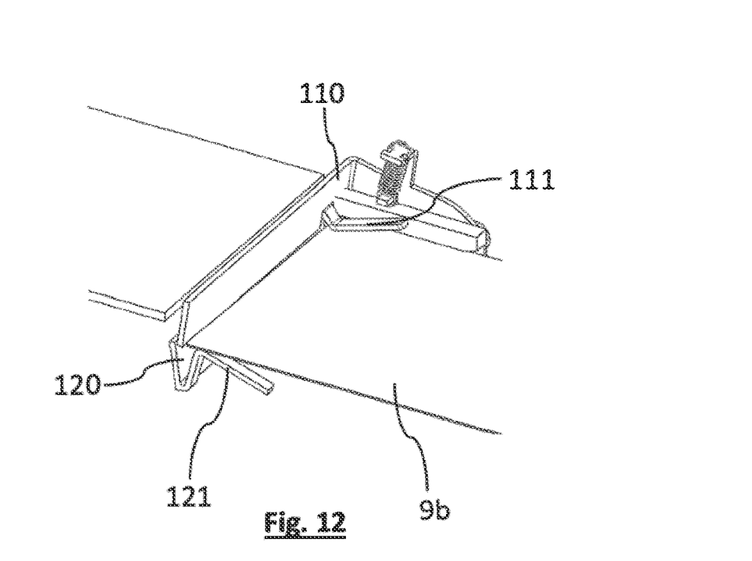
FIG. 12 shows a partial and perspective view of the shut-off mechanism of FIG. 9.
Figure 13:
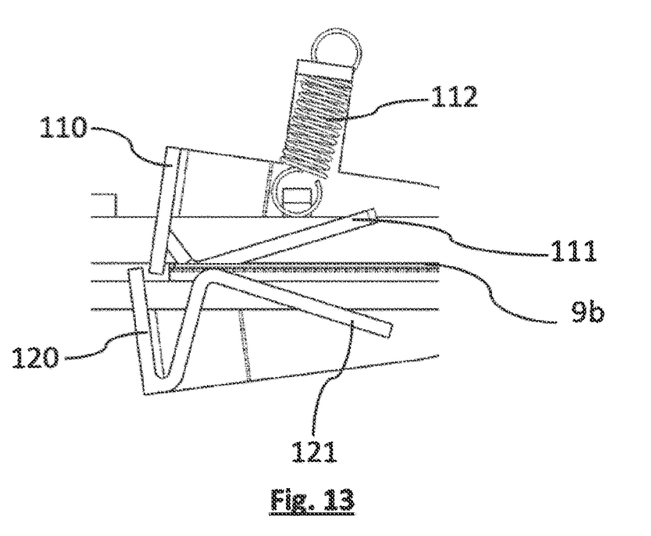
FIG. 13 shows a partial and side view of the shut-off mechanism of FIG. 9.

We will now describe more precisely the operation of the first and second assemblies 11, 12 in the case of an attempt to insert a non-compliant object 9b having a thickness that is less than that of a chip card 9a (a car park ticket as shown on FIGS. 9 and 10 for example).

As described previously, this solution prevents the two flaps from opening completely. Thus, such a non-compliant object 9b is necessarily inserted askew into the slot 13 due to the antagonistic forces of the return springs 112, 122 of the actuating cams 111, 121. Since the non-compliant object 9b is not sufficiently thick, it will slip on the actuating cams 111, 121 and will therefore be inserted askew into the slot 13.

In this situation, shown on FIG. 10 in particular, we see that the non-compliant object 9b has moved along the first actuating cam 111 and upwards. The non-compliant object 9b has therefore been forced to enter inclined into the slot 13. In this inclined position, the actuating cams 112, 121 of the front 110 and rear 120 flaps are not actuated sufficiently and consequently the flaps do not open sufficiently to allow the non-compliant object 9b to be inserted.

In short, the action of the return springs 112, 122 on the cams 111, 121 increases the inclination of the non-compliant object 9b in the slot 13. Each of the springs 112, 122 applies an antagonistic force on the non-compliant object 9b. For example, on FIG. 10, the spring 112 applies an upward force on the left side of the non-compliant object 9b whereas the spring 122 applies a downward force on the right side of the non-compliant object 9b.

When the non-compliant object 9b continues to move into the slot 13, it is therefore always askew and its action on the actuating cams 111, 121 is therefore neither optimum nor sufficient to actuate the actuating cams 111, 121 through the predetermined angle that is sufficient to open the flaps 110, 120.

The non-compliant object 9b will therefore abut against at least one of the front 110 or rear 120 shut-off flaps, thereby preventing it from moving forward.

In addition, when a non-compliant object 9b introduced into the slot 13 is not sufficiently rigid (for example a cardboard or paper car park or underground ticket), it is also unable to move the actuating cams 111, 121 which are held by the return springs 112, 122. Since it is not sufficiently rigid, the non-compliant object 9b will be unable to resist the opposing force of the return spring 112, 122. Thus, the shut-off flaps 110, 120 cannot open.

The proposed solution can therefore solve the technical problem by preventing objects having a non-compliant thickness and/or rigidity from being introduced as far as the card reader 2 and thus damaging the electronic transaction device or preventing it from operating.

In addition, the height/thickness of the slot 13 is adapted to allow a chip card to be introduced. More precisely, the height of the slot 13 is at least 0.84 mm (in compliance with standard ISO/IEC7810). More precisely, the height of the slot 13 is between 0.84 and 1 mm.

The width of the slot 13 is also adapted to allow a chip card to be introduced. More precisely, the width of the slot 13 is at least 54.18 mm. Preferably, the width of the slot 13 is between 54.18 and 56 mm.

Thus, a non-compliant object 9b having a thickness and/or a width greater than the dimensions of the slot 13 cannot be introduced into the slot.

The proposed technique can therefore be used, by means of the shut-off mechanism 11, 12 for shutting off the slot 13, to detect the width and the thickness of the object 9 introduced so as to selectively allow or not the shut-off flaps 110, 120 to open.

The width of the object 9 is detected firstly by the width of the slot 13 which prevents the wider non-compliant objects 9b from being inserted and secondly by the implementation of the actuating cams 111, 121 at each edge of the slot 13 which prevents the shut-off flaps 110, 120 from opening when the object 9 is not sufficiently wide.

The thickness is detected firstly due to the height of the slot 13 which blocks the non-compliant objects 9b, that are too thick, and secondly via the actuating cams 111, 121 and the shut-off flaps 110, 120 which open successively and in two opposite directions, so as to block a non-compliant object 9b having a thickness less than that of a chip card 9a.

Figure 7:
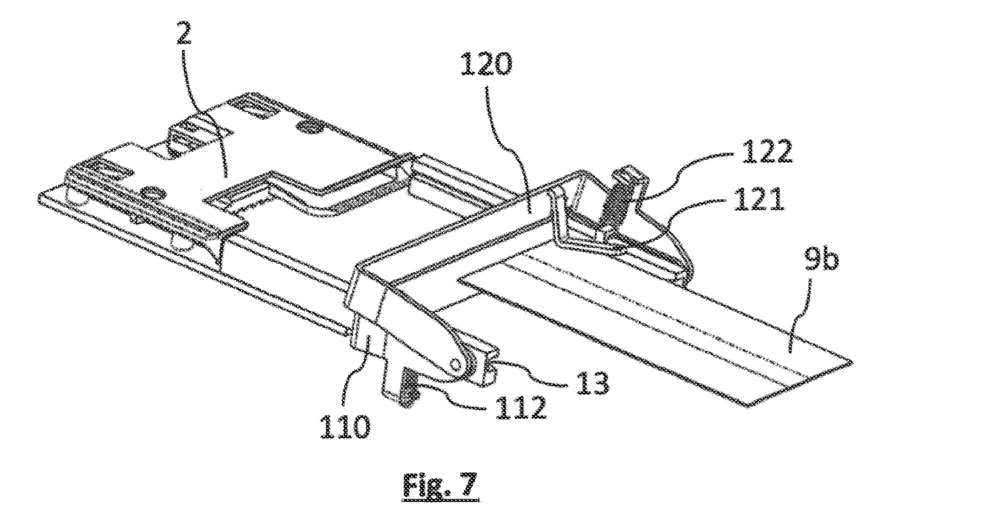
FIG. 7 shows a perspective and top view of the shut-off mechanism of FIG. 3 showing an attempt to introduce an underground ticket into the slot.
Figure 8:
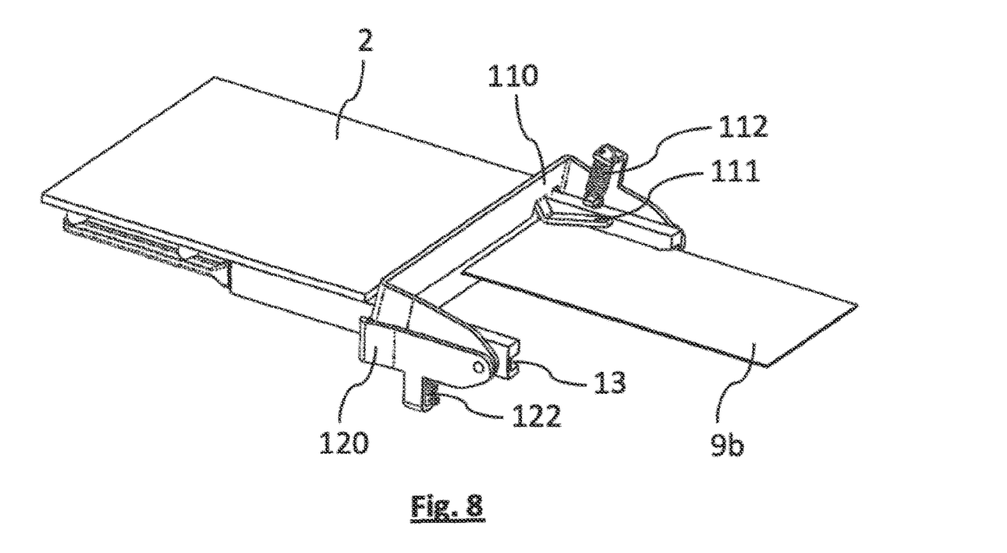
FIG. 8 shows a perspective and bottom view of the shut-off mechanism of FIG. 3 showing an attempt to introduce an underground ticket into the slot.

FIGS. 7 and 8 show an example of the proposed technique wherein a non-compliant object 9b, in this example an underground ticket, is introduced into the slot 13.

As shown, the width of the underground ticket 9b is substantially less than the width of the slot 13. Thus, the underground ticket 9b is unable to actuate the two actuating cams 111, 121 at the same time.

In this example, on FIG. 7, the underground ticket 9b is inserted next to the right edge of the slot 13. The underground ticket 9b therefore only actuates the second actuating cam 121 of the rear flap 120.

Consequently, the front flap 110 remains in the closed position and the underground ticket 9b abuts against the front flap 110. It is therefore impossible to introduce the underground ticket 9b into the slot 13, as far as the chip card reader 2.

On FIG. 8 however (on which the card reader has been turned over compared with FIG. 7), the underground ticket 9b is introduced from the other side of the slot 13 and only actuates the first actuating cam 111 of the front flap 110. Consequently, the front flap 110 opens but the underground ticket 9b abuts against the rear flap 120. Since the second actuating cam 121 is not actuated, the rear flap 120 remains in the closed position. It is therefore impossible to introduce the underground ticket 9b into the slot 13, as far as the chip card reader 2.

According to another example (not shown), if the underground ticket 9b was introduced in the centre of the slot 13, in other words between the two actuating cams 111, 121, then neither of the actuating cams 111, 121 would be actuated and neither of the shut-off flaps 110, 120 would therefore be opened. The underground ticket 9b would therefore abut directly against the front flap 110 and would be prevented from reaching the chip card reader 2.

FIGS. 9 to 13 show an example of the proposed technique wherein a non-compliant object 9b, in this example a car park ticket, is introduced into the slot 13.

As shown, the width of the car park ticket 9b complies with the width of the slot 13, in other words it is substantially identical to the width of a chip card 9a. However, the thickness and rigidity of the car park ticket 9b are substantially less than those of a chip card 9a.

As described previously, when the car park ticket 9b is inserted into the slot 13, it comes into contact simultaneously with the two actuating cams 111 and 121. However, due to its low thickness and its low rigidity, it does not actuate them sufficiently to cause the shut-off flaps 110 and 120 to open. In addition, the return springs 112 and 122 will apply their antagonistic forces on each side of the car park ticket 9b, resulting in its inclination (as shown on FIGS. 10 and 11) and therefore the insufficient actuation of the cams 111, 121.

The proposed technique can therefore be used to detect a non-compliant object 9b and prevent it from being introduced into the slot 13.

The invention claimed is:

1. An electronic transaction device, comprising a chip card reader and a shut-off mechanism for shutting off a slot for an introduction of a chip card as far as said card reader, said slot being formed by at least two lateral guide rails for guiding said chip card, characterised in that said mechanism comprises a first shut-off flap and a second shut-off flap for shutting off said slot, said shut-off flaps being able to adopt a closed position preventing a non-compliant object from being introduced into said slot as far as said chip card reader, and an open position allowing said chip card to be introduced into said slot as far as said chip card reader; and in that said shut-off flaps each comprise an actuating element which is situated respectively in a vicinity of one of said two lateral guide rails of said slot, and in that said first flap moves from said closed position to said open position in a first direction and in that said second flap moves from said closed position to said open position in a second direction, opposite said first direction.

2. The electronic transaction device according to claim 1, characterised in that said actuating elements are implemented opposite each other in a horizontal plane of said slot.

3. The electronic transaction device according to claim 2, characterised in that said actuating elements consist of a first actuating cam and a second actuating cam respectively attached to said first and second shut-off flaps.

4. The electronic transaction device according to claim 3, characterised in that a displacement travel of said shut-off flaps depends on a thickness of said chip card introduced or of said non-compliant object introduced.

5. The electronic transaction device according to claim 4, characterised in that said two shut-off flaps adopt their open position when said actuating elements are actuated simultaneously and through a predetermined displacement angle.

6. The electronic transaction device according to claim 5, characterised in that said shut-off flaps each comprise a return spring.

7. The electronic transaction device according to claim 1, characterised in that dimensions of said slot are substantially identical to standard dimensions of a chip card.

8. The electronic transaction device according to claim 1, characterised in that said actuating elements consist of a first actuating cam and a second actuating cam respectively attached to said first and second shut-off flaps.

9. The electronic transaction device according to claim 1, characterised in that a displacement travel of said shut-off flaps depends on a thickness of said chip card introduced or of said non-compliant object introduced.

10. The electronic transaction device according to claim 1, characterised in that said two shut-off flaps adopt their open position when said actuating elements are actuated simultaneously and through a predetermined displacement angle.

11. The electronic transaction device according to claim 1, characterised in that said shut-off flaps each comprise a return spring.

\* \* \* \* \*